(12) United States Patent
Kutil et al.

(10) Patent No.: US 10,247,596 B2
(45) Date of Patent: Apr. 2, 2019

(54) LEVEL MEASUREMENT DEVICE

(71) Applicant: Endress + Hauser GmbH + Co. KG, Maulburg (DE)

(72) Inventors: Alexandre Kutil, Greenwood, IN (US); Rob Vermeulen, Greenwood, IN (US)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 450 days.

(21) Appl. No.: 15/008,903

(22) Filed: Jan. 28, 2016

(65) Prior Publication Data
US 2017/0219407 A1    Aug. 3, 2017

(51) Int. Cl.
| | |
|---|---|
| *G01F 23/284* | (2006.01) |
| *G01S 7/02* | (2006.01) |
| *B08B 7/02* | (2006.01) |
| *G01S 7/03* | (2006.01) |
| *G01S 7/40* | (2006.01) |
| *G01S 13/88* | (2006.01) |

(Continued)

(52) U.S. Cl.
CPC .............. *G01F 23/284* (2013.01); *B08B 7/02* (2013.01); *G01S 7/02* (2013.01); *G01S 7/03* (2013.01); *G01S 7/40* (2013.01); *G01S 13/88* (2013.01); *H01Q 1/225* (2013.01); *H01Q 13/24* (2013.01); *H01Q 19/08* (2013.01); *G01S 2007/027* (2013.01); *G01S 2007/4043* (2013.01); *H01Q 1/42* (2013.01); *H01Q 21/28* (2013.01); *H01Q 25/002* (2013.01)

(58) Field of Classification Search
CPC ......... B08B 7/02; G01F 23/284; G01S 13/88; G01S 2007/027; G01S 2007/4043; G01S 7/02; G01S 7/03; G01S 7/40; H01Q 13/24; H01Q 19/08; H01Q 1/225; H01Q 1/42; H01Q 21/28; H01Q 25/002
USPC ............................................................ 342/124
See application file for complete search history.

(56) References Cited

U.S. PATENT DOCUMENTS

| | | | |
|---|---|---|---|
| 6,917,326 B1* | 7/2005 | Tregenza ................. | B08B 7/02 342/118 |
| 2005/0132797 A1* | 6/2005 | Klees .................... | G01F 23/284 73/290 V |

(Continued)

FOREIGN PATENT DOCUMENTS

EP    1643221    *    9/2005

*Primary Examiner* — Timothy X Pham
(74) *Attorney, Agent, or Firm* — Bacon & Thomas, PLLC

(57) ABSTRACT

A level measurement device for measuring a level (L) of a product, in particular a product contained in a container, comprising: mounting means for mounting said measurement device at a measurement site, an antenna comprising a dielectric antenna element for transmitting microwave signals (S) towards the product and/or for receiving echo signals (R) resulting from reflections of the transmitted microwave signals, and measurement electronics for determining the level (L) of the product based on a transit time needed for the microwave signals to travel to a surface of the product and of their echo signals to return to the device, is described allowing to prevent deposits to build up, which may eventually impair transmission and/or reception of the signals. To this extent, the measurement device according to the invention comprises a cap covering said dielectric antenna element and cleaning means for cleaning said cap are foreseen, which cause said cap to vibrate when they are activated.

14 Claims, 1 Drawing Sheet

(51) Int. Cl.
*H01Q 1/22* (2006.01)
*H01Q 13/24* (2006.01)
*H01Q 19/08* (2006.01)
H01Q 1/42 (2006.01)
H01Q 21/28 (2006.01)
H01Q 25/00 (2006.01)

(56) References Cited

U.S. PATENT DOCUMENTS

2013/0113644 A1* 5/2013 Nakagawa .......... G01F 23/2845
 342/6
2015/0276462 A1* 10/2015 Kleman .............. G01F 25/0076
 342/124
2015/0377679 A1* 12/2015 Nilsson .................. G01S 13/88
 342/124

* cited by examiner

LEVEL MEASUREMENT DEVICE

TECHNICAL FIELD

The present invention concerns a level measurement device for measuring a level of a product, in particular a product contained in a container, comprising: mounting means for mounting said measurement device at a measurement site, an antenna comprising a dielectric antenna element for transmitting microwave signals towards the product and/or for receiving echo signals resulting from reflections of the transmitted microwave signals, and measurement electronics for determining the level of the product based on a transit time needed for the microwave signals to travel to a surface of the product and of their echo signals to return to the device.

BACKGROUND DISCUSSION

Level measurement devices of this type are e.g. used in in industrial applications e.g. for measuring a filling level of a product in a container.

Microwave level measurement devices transmit microwaves toward the surface of the product and receive echo signals of the transmitted microwaves. Based on the echo signals received an echo function representing an echo amplitude as a function of a distance or time is determined during each measurement. Based on the echo function a transit time required for a microwave signal to travel from the device to the surface of the product and of its echo to return to the device is determined. The distance between the device and the surface is then determined based on the transit time.

Various microwave level measuring techniques are known in the art which permit short distances to be measured by means of reflected waves. The most frequently used systems are pulse radar systems and frequency-modulated continuous wave radar systems (FMCW-Radar). Pulse radar level measurement devices periodically send short microwave pulses. The transit time between the transmission of the microwave pulse and the reception of its echo is measured and the level is determined based on the transit time. FMCW radar level measurement devices transmit a continuous microwave signal, which is periodically linearly frequency modulated. The frequency of the received echo signal differs from the frequency of the transmitted signal by an amount, which depends on the transit time between the emission and the reception of the corresponding echo signal.

The microwave signals are transmitted and received via antennas. To this extent, the devices can either comprises a transmitting antenna and a separate receiving antenna or they can comprise a single antenna for sending and receiving microwave signals. Different types of antennas are known in the art, e.g. horn antennas or rod antennas.

German application DE 10 2013 11 42 40 A1 describes a level measurement device for measuring a level of a product, in particular a product contained in a container, comprising:
mounting means for mounting said measurement device at a measurement site,
an antenna comprising a dielectric antenna element for transmitting microwave signals towards the product and/or for receiving echo signals resulting from reflections of the transmitted microwave signals, and
measurement electronics for determining the level of the product based on a transit time needed for the microwave signals to travel to a surface of the product and of their echo signals to return to the device.

The antenna of this device comprises an essentially ball shaped antenna element for transmission and reception of microwave signals. The antenna is connected to the measurement electronics via a wave guide and the antenna element is mounted onto an end section of the wave guide. To this extent, an extension is foreseen on the antenna element and the extension is secured inside the end section of the wave guide facing the product.

In many applications antennas of measurement devices will be exposed to gases, in particular to air, which may contain particles, in particular dust. In case particles deposit on the antenna, this will alter the transmission properties of the antenna. The extent to which the transmission properties are affected by deposits depends on the thickness and the dielectric properties of the deposits. Deposits affecting the transmission properties of the antenna will in turn affect the measurement properties of the device and thus lead to a reduced measurement accuracy.

In order to overcome this problem measurement devices can be equipped with a rinsing system for removing deposits. A rinsing system for rinsing an inside surface of a horn antenna is for example described in International Application WO2006/063930 A1. This system comprises a rinsing device, which is designed to send a pressurized rinsing medium through a nozzle across the surface of the antenna. The rinsing medium is for example a pressurized gas, e.g. compressed air, or a rinsing liquid.

Rinsing systems require the installation of the rinsing device as well as a reservoir for the rising medium, which will need to be refilled regularly. Since the system is operated under pressure, measures need to be taken to prevent leakages. In consequence installation and maintenance costs of rinsing systems are comparatively high.

With respect to horn antennas, it is known in the art, that the installation and maintenance costs involved in the application of the pressurized rinsing systems can be avoided, if a vibratory cleaning mechanism is used instead of a rinsing system, which causes the horn to vibrate when activated. A vibratory cleaning mechanism for cleaning a horn antenna is described in U.S. Pat. No. 6,917,326 B1. This cleaning mechanism comprises a piezoelectric transducer comprising two piezoelectric rings. The rings are clamped between two sections of a hollow outer conductor of a wave guide connected to the horn. When activated, the transducer generates acoustic waves which propagate in a direction essentially parallel to ta longitudinal axis of wave guide and horn through the horn antenna causing the horn to vibrate. Due to the vibration deposits will be at least partially dislodged or removed from the inner surface of the horn antenna. It is described to tune the frequency of the vibration to the natural resonance frequency of the horn or to adjust or tune frequency and/or amplitude of the vibration to allow optimum performance for the material to be removed from the antenna.

Just like the horns of horn antennas the dielectric antenna elements of antennas comprising dielectric antenna elements for transmitting and/or receiving microwave signals may be exposed to gases containing particles, which may deposit on the dielectric antenna element. Deposits on the antenna element will alter the transmission properties of the antenna. Thus there is a need in industry to protect antennas comprising dielectric antenna elements for transmitting and/or receiving microwave signals from deposits impairing transmission and/or reception of the signals.

It is an object of the invention to provide a level measurement device comprising an antenna comprising a dielectric antenna element for transmitting and/or receiving microwave signals, allowing to prevent deposits to build up, which may eventually impair transmission and/or reception of the signals.

SUMMARY OF THE INVENTION

To this extent, the invention comprises a level measurement device for measuring a level of a product, in particular a product contained in a container, comprising:
mounting means for mounting said measurement device at a measurement site,
an antenna comprising a dielectric antenna element for transmitting microwave signals towards the product and/or for receiving echo signals resulting from reflections of the transmitted microwave signals, and
measurement electronics for determining the level of the product based on a transit time needed for the microwave signals to travel to a surface of the product and of their echo signals to return to the device, wherein according to the invention
the device further comprises a cap covering said dielectric antenna element, and
cleaning means for cleaning said cap are foreseen, which cause said cap to vibrate when they are activated.

According to a further preferred embodiment said dielectric antenna element is an essentially ball shaped element comprising a spherical front surface to be directed towards the product, through which microwave signals are to be transmitted and/or received.

According to a further preferred embodiment,
said antenna is connected to said measurement electronics via a wave guide,
an extension is foreseen on said antenna element, and
said extension is secured inside an end section of said wave guide facing the product, when the device is mounted at the measurement site.

According to a further preferred embodiment, said cap is made out of a material transparent to the microwave signals to be transmitted and/or received by the antenna, in particular out of the same dielectric material as said antenna element, in particular out of polytetrafluorethylen (PTFE), According to a first refinement of the invention, said cap is spaced apart from a front surface of said antenna element, through which said microwave signals are to be transmitted and/or received, which is small and at the same time large enough to allow for the cap to vibrate freely, in particular by a distance of the order of the size of an amplitude of the vibration of the cap.

According to a second refinement,
said antenna element is mounted on an end section of a wave guide facing the product, when the device is mounted at the measurement site, and
mounting means, in particular clamping means, are foreseen for mounting a cylindrical end section of the cap onto an outer conductor of said end section of said wave guide.

According to a refinement of the second refinement,
a reinforcement is foreseen on the outer conductor, and
said end section of said cap is mounted on, in particular clamped onto, to said reinforcement.

According to a third refinement,
said measurement electronics is located in a position separated from the measurement site the antenna element is exposed to when the device is mounted at a measurement site by a separating element, in particular a separating element connected to said mounting means or forming an integral part of said mounting means, in particular a separating element provided by a disc shaped central section of a flange,
said antenna is connected to said measurement electronics via a wave guide extending through said separating element, and
said cap is mounted onto an underside of said separating element facing the measurement site, when the device is mounted at the measurement site.

According to a refinement of the third refinement,
an end section of the cap comprises an extension on its outer side, and
said extension extends parallel to a surface of said separating element and is pressed against this surface by a holder engaging said extension, which holder is mounted onto the underside of said separating element.

According to a fourth refinement, said cleaning means comprise a drive interacting with a side wall section of the cap spaced apart from a signal transmission path along which said microwave signals are to be transmitted and/or received via a front surface of the antenna element facing the product, such that said drive causes said side wall section and in consequence said cap to vibrate, when it is activated.

According to a refinement of the fourth refinement, said drive is either an electromagnetic drive comprising:
a magnetic element, in particular a soft magnetic plate, integrated in or mounted on said side wall section of said cap,
a driving unit facing said magnetic element, which is foreseen on an outside of said side wall section of said cap and comprises a coil system comprising at least one coil, and
drive electronics connected to said driving unit for generating an alternating current to be send trough said coil system when said drive is to be activated,
or a piezoelectric drive comprising:
a piezoelectric driving unit resting on an outside surface of said side wall section of said cap and comprising at least one piezoelectric element, and
drive electronics connected to said driving unit for generating an alternating voltage to be applied to said at least one piezoelectric element of the driving unit when said drive is to be activated.

According to a refinement of the first alternative of the last mentioned refinement,
a separating element, in particular a separating element connected to said mounting means or forming an integral part of said mounting means, in particular a separating element provided by a disc shaped central section of a flange, is foreseen, providing a separation between said measurement site and its surrounding, when said device is mounted at said measurement site, and
said driving unit is mounted on a mechanical support extending through said separating element in a position located opposite said side wall section such, that said driving unit is facing said magnetic element.

According to a fifth refinement,
said cleaning means comprise a driving unit, in particular an electromagnetic driving unit or a piezoelectric driving unit and drive electronics connected the said driving unit,
energy storing means, in particular storing means comprising a rechargeable battery or at least one rechargeable capacitor, connected to said measurement electronics and to said drive electronics are foreseen,
said energy storing means are to be charged by surplus energy provided to them by said measurement electronics during times, when more energy than required by the measurement electronics at the time is available to the measurement electronics, and energy stored in the energy storing means provides a sole or additional energy source for powering the cleaning means.

According to a preferred embodiment of the fifth refinement, said measurement device is a two-wire measurement device to be powered by a two wire control loop connected to an external power supply, and an input/output unit is foreseen for transmitting measurement results obtained by said measurement device during measurement operation by controlling a current flowing through the control loop to be proportional to said measurement results.

According to a sixth refinement, said cleaning means are powered by an external power supply to be connected thereto, or a service port connected to said measurement electronics is foreseen, allowing for a service tool to be connected to said measurement device and to be powered by the measurement device during service time intervals, and said cleaning means are connected to said service port and powered by said measurement electronics during operation of said device, when no service tool is connected to said service port.

The invention and its advantages are explained in more detail using the figures of the drawing, in which two exemplary embodiments are shown. The same reference numerals refer to the same elements throughout the figures.

DETAILED DESCRIPTION

Figure 1:
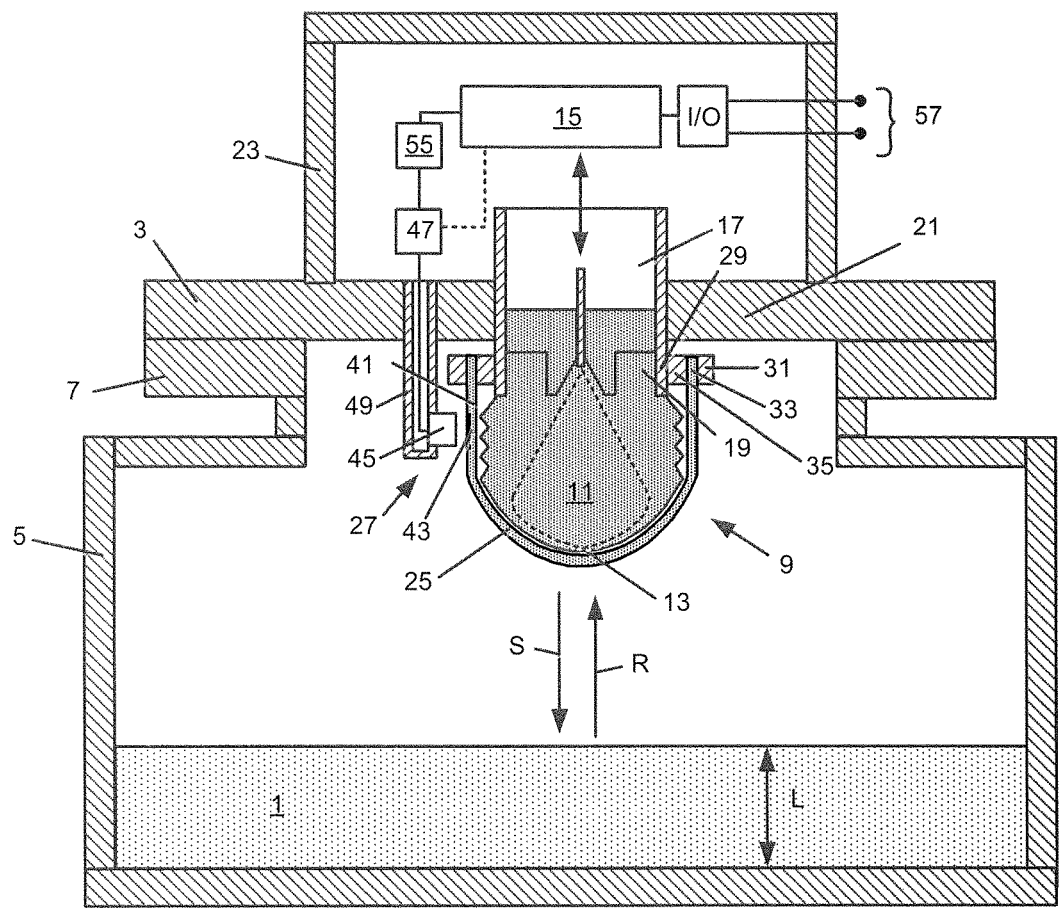
FIG. 1 shows: a microwave level measurement arrangement comprising an embodiment of a level measurement device according to the invention.

FIG. 1 shows a level measurement arrangement comprising a level measurement device according to the invention for measuring a level L of a product 1. The level measurement device comprises mounting means 3 for mounting the device at a measurement site. In the embodiment shown the product 1 is contained in a container 5 and the mounting means 3 comprise a flange to be mounted onto a corresponding counter flange 7 surrounding an opening of the container 5. Obviously alternative types of mounting means for mounting measurement devices known in the art can be used.

During level measurement operation, the level measurement device transmits microwave signals S towards the surface of the product 1 and receives echo signals R resulting from reflections of the transmitted microwave signals S on a surface of the product 1. To this extent, the device can either comprise a transmitting antenna for transmitting the microwave signals towards the product 1 and a separate receiving antenna for receiving the echo signals resulting from reflections of the transmitted microwave signals or a single antenna 9 for transmitting the microwave signals towards the product 1 and for receiving the echo signals R of the transmitted microwave signals S. The later alternative is shown in FIG. 1.

The invention concerns level measurement devices, comprising at least one antenna 9 comprising an antenna element 11 for transmitting and/or for receiving microwave signals. The antenna element 11 consists of a dielectric material, e.g. polytetrafuorethylen (PTFE) and comprises a front surface 13 to be directed towards the surface of the product 1 through which the microwave signals are transmitted and/or received. In the embodiment shown, the dielectric antenna element 11 is an essentially ball shaped element comprising a spherical front surface 13.

The measurement device comprises measurement electronics 15 for determining the level L of the product 1 based on a transit time needed for microwave signals S to travel to the surface of the product 1 and their echo signals R to return to the device. To this extent, the measurement electronics 15 comprise means for generating microwave signals to be transmitted via the antenna 9 and means for determining the level L based on the transit time required for their echo signals to return. The measurement device can e.g. be a pulse radar or an FMCV radar level measurement device. Corresponding measurement electronics are known in the art and thus not described in detail here.

The antenna 9 is connected to the measurement electronics 15 via a wave guide 17 transmitting signals generated by the measurement electronics 15 to the antenna 9 and transmitting echo signals received by the antenna 9 to the measurement electronics 15. The antenna element 11 is preferably mounted onto an end section of the wave guide 17 facing the product 1, when the device is mounted at the measurement site. In the embodiment shown, the antenna element 11 is mounted onto the wave guide 17 via an extension 19 foreseen on the antenna element 11, which is secured inside the end section of the wave guide 17.

The measurement device preferably comprises a separating element 21, e.g. a separating wall, providing a separation between the measurement site and its surrounding, when the device is mounted at the measurement site. The separating element 21 can e.g. be connected to the mounting means 3 or form an integral part thereof. In the embodiment shown in FIG. 1, the separating element 21 is provided by a disc shaped central section of the flange closing off the opening of the container 5. The antenna element 11 is located on the side of the separating element 21 facing the measurement site and the measurement electronics 15 is preferably located in a housing 23 foreseen on the side of the separating element 21 facing the surrounding. In this case the wave guide 17 connecting the measurement electronics 15 to the antenna 9 extends through the separating element 21.

According to the invention the antenna element 11 is covered by a cap 25 and cleaning means 27 for cleaning the cap 25 are foreseen, which cause the cap 25 to vibrate when they are activated.

Since the antenna element 11 is protected by the cap 25, no particles prevailing at the measurement site can come into contact with the antenna element 11. Dust or other particles can only adhere or build up on the outside of the cap 25, which can be cleaned by the cleaning means 27. When the cleaning means 27 are activated, the vibration of the cap 25 will loosen and shake off particles adhering to the outside of the cap 25. Depending on the type of process run at the measurement site and the corresponding rate at which deposits are likely to build up on the outside of the cap 25, the cleaning means 27 can e.g. by activated regularly, e.g. at predetermined time intervals, or on demand. In case level measurements have to be performed with very high accuracy at all times, the measurements are preferably interrupted during cleaning times, when the cleaning means 27 are activated.

The cap 25 is made out of a material transparent to the microwave signals to be transmitted and/or received by the antenna element 11. To this extent, the cap 25 is preferably made out of a dielectric material, e.g. out of the same dielectric material as the dielectric antenna element 11, e.g. out of polytetrafluorethylen (PTFE).

The cap 25 is preferably spaced apart from the front surface 13 of the antenna element 11, through which the signals are to be transmitted and/or received, by a distance, which is preferably small and at the same time large enough to allow for the cap 25 to vibrate freely, in particular by a distance of the order of the size of an amplitude of the vibration of the cap 25. Since the cap 25 is not connected to the front surface of the antenna element 11, the distance between the front surface 13 and the cap 25 can be chosen freely according to the vibration amplitude best suited to remove particles adhering to the outside of the cap 25.

In the embodiment shown in FIG. 1, the antenna element 11 is mounted on an end section of the wave guide 17 extending through the separating element 21 and the cap 25 is mounted onto an end section of an outer conductor 29 of the wave guide 17 facing the product 1. To this extent, mounting means 31, e.g. clamping means, are foreseen for mounting a cylindrical end section 33 of the cap 25 onto the end section of the outer conductor 29.

In this embodiment, the outer conductor 29 is preferably equipped with a reinforcement 35 and the end section 33 of the cap 25 is mounted on, e.g. clamped onto, the reinforcement 35. The reinforcement 35 not only reduces the susceptibility of the wave guide 17 as well as the antenna element 11 connected thereto to vibrations caused by the cleaning means 27, but can also be used to bridge a gap between the outer conductor 29 and the end section 33 of the cap 25, in case an outer diameter of the outer conductor 29 is smaller than the inner diameter of the end section 33, which in turn has to be larger than the largest outer diameter of the antenna element 11, in order to allow for the cap 25 to be put in place.

Figure 2:
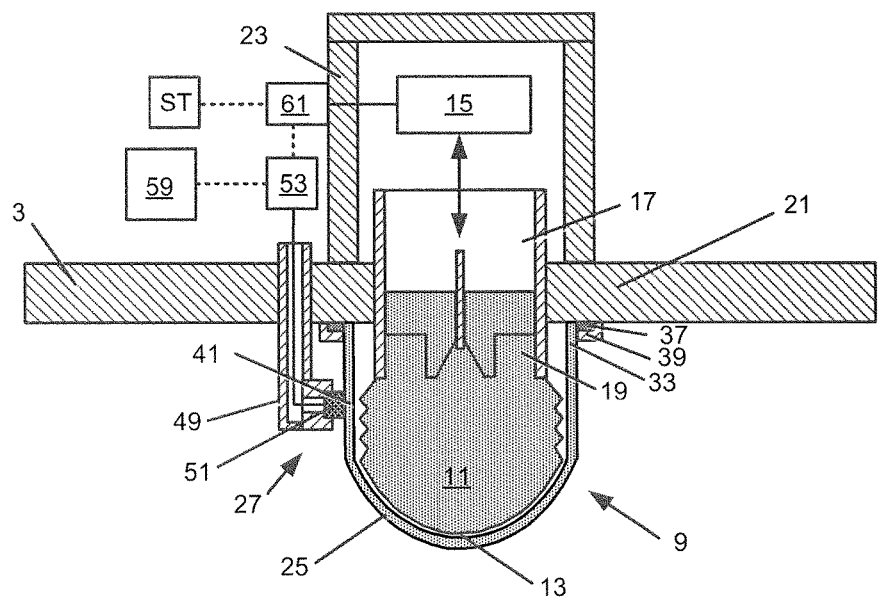
FIG. 2 shows: an alternative embodiment of a level measurement device according to the invention.

As an alternative, the cap 25 can e.g. be mounted onto an underside of the separating element 21 facing towards the product 1, when the device is mounted at the measurement site. This alternative is shown in FIG. 2. In this embodiment the end section 33 of the cap 25 preferably comprises an extension 37 on its outer side, which extends parallel to the surface of the separating element 21 and is pressed against this surface by a holder 39 engaging the extension 37, which is mounted onto the underside of the of the separating element 21, e.g. screwed onto it.

The cleaning means 27 comprise a drive interacting with a side wall section 41 of the cap 25 such that the drive causes the side wall section 41 and in consequence the entire cap 25 to vibrate, when it is activated. The side wall section 41 is spaced apart from a signal transmission path, along which the microwave signals are to be transmitted and/or received via the front surface 13 of the antenna element 11 facing the product 1. The transmission path is visualized in FIG. 1 by a transmission coil schematically indicated by a dotted line.

The drive can e.g. be an electromagnetic drive as is shown in FIG. 1. In this case the drive comprises a magnetic element 43, e.g. a soft magnetic plate, integrated in or mounted on the side wall section 41 of the cap 25 and a driving unit 45 facing the magnetic element 43 is foreseen on the outside of the side wall section 41 opposite the magnetic element 43. The driving unit 45 comprises a coil system comprising at least one coil which is connected to drive electronics 47 generating an alternating current to be send trough the coil system when the drive is to be activated.

The driving unit 45 is preferably mounted on a mechanical support 49 extending through the separating element 21 in a position, which is located opposite the side wall section 41 comprising the magnetic element 43 such, that the driving unit 45 is facing the magnetic element 43.

As an alternative a piezoelectric drive as shown in embodiment shown in FIG. 2 can be used. This drive differs from the drive shown in FIG. 1 in that the drive comprises a piezoelectric driving unit 51 resting on an outside surface of the side wall section 41 of the cap 23. The piezoelectric driving unit 51 comprises at least one piezoelectric element and is preferably mounted on a mechanical support 49 extending through the separating element 21 of the device such that the driving unit 51 rests on the outside surface of the side wall section 41 spaced apart from a signal transmission path. The driving unit 51 is connected to drive electronics 53 generating an alternating voltage to be applied to the piezoelectric elements when the drive is to be activated. In this case the alternating voltage applied to the piezoelectric elements causes thickness oscillations of the piezoelectric driving unit 51 resting on the side wall section 41 of the cap 25, which in turn cause the cap 25 to vibrate.

The power required to activate the cleaning means 27 can e.g. be provided by the measurement electronics 15 connected to the drive electronics 47 or 53 respectively, which in turn is powered by an external power supply not shown in the figures. If sufficient power to operate the level measurement device including the cleaning means 27 is available at all times, no further measures need to be taken.

In case sufficient power may not always be available, the measurement device preferably comprises energy storing means 55 connected to the measurement electronics 15 and to the drive electronics 47 as shown in FIG. 1. The energy storing means 55 are charged by surplus energy provided to them by the measurement electronics 15 during times, when more energy than required by the measurement electronics 15 at the time is available to the measurement electronics 15. The energy stored in the energy storing means 55 then provides a sole or additional energy source for powering the cleaning means 27 whenever cleaning of the cap 25 is required. The energy storing means 55 can e.g. be means comprising a rechargeable battery or at least one rechargeable capacitor to be charged by the measurement electronics 15 and to be discharged during activation of the cleaning means 27.

Energy storing means 55 are especially advantageous, in case the measurement device is a so-called two-wire measurement device. Two-wire measurement devices are powered via a two-wire supply loop connected to an external power supply and transmit their measurement results by controlling a loop current flowing through the two wire supply loop to be proportional to the measurement result.

In this case, the measurement electronics 15 preferably comprise an input/output unit I/O equipped with two connectors 57 for connecting of the level measurement device to the two-wire supply loop, as shown in FIG. 1. The input/output unit I/O provides power to the measurement electronics 15. The measurement electronics 15 supplies its measurement results to the input/output unit 15, which in turn controls the loop current drawn from the external power supply—not shown in FIG. 1—to be proportional the measurement result. An industry standard has been developed according to which the measurement devices are powered by a 24 volt DC power source and the loop current representing the measurement result is varied between four and twenty milliamps. A minimal level of the product 1 can e.g. be represented by a current of four milliamps and a maximal level by a current of twenty milliamps. Thus power available varies in correspondence with the measurement results. During times, where the loop current is sufficiently high, to provide more power than required by the measurement electronics 15 at the time the surplus energy is used to recharge the energy storing means 55. This power is then available to power the cleaning means 27 in case cleaning is required during times where the loop current is low.

Alternatively, the cleaning means 27 can be powered by a separate external power supply 59 connected to the drive electronics 53. This alternative is shown as one option in FIG. 2.

As a further alternative shown as another option in FIG. 2, the level measurement device can be equipped with a service port 61 allowing for a service tool ST to be connected to the measurement device. Service tools are known in the art and thus not described in detail herein. The service tool ST can e.g. be applied in order to perform services on the device, e.g. in order to perform diagnoses, data transfers or software updates. The service port 61 is connected to the measurement electronics 15 and allows for the service tool ST to be connected to the device and to be powered by energy provided by the measurement electronics 15. The service tool ST will however only be connected to the service port 61 during comparatively short service time intervals when service is actually required. During normal operation, no service tool is connected to the service port 61. In measurement devices according to the invention, comprising a service port 61, the service port 61 is preferably used to power the cleaning means 27 by connecting the cleaning means 27 to the service port 61 during operation of the device. In this case however, the cleaning means 27 have to be disconnected from the service port 61, when the service port 61 is needed to connect a service tool to the device.

What is claimed is:

1. Level measurement device for measuring a level (L) of a product, in particular a product contained in a container, comprising:
    mounting means for mounting said measurement device at a measurement site,
    an antenna comprising a dielectric antenna element consisting of a dielectric material for transmitting microwave signals (S) towards the product and/or for receiving echo signals (R) resulting from reflections of the transmitted microwave signals, and
    measurement electronics for determining the level of the product based on a transit time needed for the microwave signals to travel to a surface of the product and of their echo signals to return to the device,
    wherein the device further comprises a cap covering said dielectric antenna element, and a cleaning means causing said cap to vibrate when said cleaning means is activated for cleaning said cap,
    wherein said cap is spaced apart from a front surface of said antenna element, through which said microwave signals are to be transmitted and/or received, which is small and at the same time large enough to allow for the cap to vibrate freely, in particular by a distance of the order of the size of an amplitude of the vibration of the cap.

2. The level measurement device according to claim 1, wherein said dielectric antenna element is an essentially ban shaped element comprising a spherical front surface to be directed towards the product, through which microwave signals are to be transmitted and/or received.

3. The level measurement device according to claim 1, wherein
    said antenna is connected to said measurement electronics via a wave guide,
    an extension is provided on said antenna element, and
    said extension is secured inside an end section of said wave guide facing the product, when the device is mounted at the measurement site.

4. The level measurement device according to claim 1, wherein that said cap is made out of a material transparent to the microwave signals to be transmitted and/or received by the antenna, in particular out of the same dielectric material as said antenna element, in particular out of polytetrafluorethylen (PTFE).

5. The level measurement device according to claim 1, wherein
    said antenna element is mounted on an end section of a wave guide facing the product, when the device is mounted at the measurement site, and
    a mounting means, in particular clamping means, is provided for mounting a cylindrical end section of the cap onto an outer conductor of said end section of said wave guide.

6. The level measurement device according to claim 5, wherein
    a reinforcement is provided on the outer conductor, and
    said end section of said cap is mounted on, in particular clamped onto, to said reinforcement.

7. The level measurement device according to claim 1, wherein said measurement electronics is located in a position separated from the measurement site the antenna element is exposed to, when the device is mounted at the measurement site by a separating element, in particular a separating element connected to said mounting means or forming an integral part of said mounting means, in particular a separating element provided by a disc shaped central section of a flange,
    said antenna is connected to said measurement electronics via a wave guide extending through said separating element, and
    said cap is mounted onto an underside of said separating element facing the measurement site, when the device is mounted at the measurement site.

8. The level measurement device according to claim 7, wherein an end section of the cap comprises an extension on its outer side, and
    said extension extends parallel to a surface of said separating element and is pressed against this surface by a holder engaging said extension, which holder is mounted onto the underside of said separating element.

9. The level measurement device according to claim 1, wherein said cleaning means comprises a drive interacting with a side wall section of the cap spaced apart from a signal transmission path along which said microwave signals are to be transmitted and/or received via a front surface of the antenna element facing the product, such that said drive causes said side wall section and in consequence said cap to vibrate, when it is activated.

10. The level measurement device according to claim 9, wherein said drive is either an electromagnetic drive comprising:
    a magnetic element, in particular a soft magnetic plate, integrated in or mounted on said side wall section of said cap, a driving unit facing said magnetic element, which is provided on an outside of said side wall section of said cap and comprises a coil system comprising at least one coil, and drive electronics connected to said driving unit for generating an alternating current to be send through said coil system when said drive is to be activated, or a piezoelectric drive comprising:

a piezoelectric driving unit resting on an outside surface of said side wall section of said cap and comprising at least one piezoelectric element, and drive electronics connected to said driving unit for generating an alternating voltage to be applied to said at least one piezoelectric element of the driving unit when said drive is to be activated.

11. The level measurement device according to claim 10, wherein a separating element, in particular a separating element connected to said mounting means or forming an integral part of said mounting means, in particular a separating element provided by a disc shaped central section of a flange, is provided for providing a separation between said measurement site and its surrounding, when said device is mounted at said measurement site, and said driving unit is mounted on a mechanical support extending through said separating element in a position located opposite said side wall section such, that said driving unit is facing said magnetic element.

12. The level measurement device according to claim 1, wherein said cleaning means comprises a driving unit, in particular an electromagnetic driving unit or a piezoelectric driving unit and drive electronics connected to the said driving unit, energy storing means, in particular storing means comprising a rechargeable battery or at least one rechargeable capacitor, connected to said measurement electronics and to said drive electronics is provided, said energy storing means is to be charged by surplus energy provided to them by said measurement electronics during times, when more energy than required by the measurement electronics at the time is available to the measurement electronics, and energy stored in the energy storing means provides a sole or additional energy source for powering the cleaning means.

13. The level measurement device according to claim 12, wherein said measurement device is a two-wire measurement device to be powered by a two wire control loop connected to an external power supply, and an input/output unit (I/O) is provided for transmitting measurement results obtained by said measurement device during measurement operation by controlling a current flowing through the control loop to be proportional to said measurement results.

14. The level measurement device according to claim 1, wherein said cleaning means is powered by an external power supply to be connected thereto, or a service port connected to said measurement electronics is provided, allowing for a service tool (ST) to be connected to said measurement device and to be powered by the measurement device during service time intervals, and said cleaning means is connected to said service port and powered by said measurement electronics during operation of said device, when no service tool (ST) is connected to said service port.

* * * * *